(12) United States Patent
Taki et al.

(10) Patent No.: US 9,419,306 B2
(45) Date of Patent: Aug. 16, 2016

(54) NONAQUEOUS ELECTROLYTE AND NONAQUEOUS SECONDARY BATTERY USING SAME

(71) Applicant: ADEKA CORPORATION, Tokyo (JP)

(72) Inventors: Takayuki Taki, Tokyo (JP); Hiroaki Watanabe, Tokyo (JP); Atsuki Shibuya, Tokyo (JP); Akiko Tasaki, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 327 days.

(21) Appl. No.: 14/346,533

(22) PCT Filed: Nov. 1, 2012

(86) PCT No.: PCT/JP2012/078304
§ 371 (c)(1),
(2) Date: Mar. 21, 2014

(87) PCT Pub. No.: WO2013/069529
PCT Pub. Date: May 16, 2013

(65) Prior Publication Data
US 2014/0242456 A1    Aug. 28, 2014

(30) Foreign Application Priority Data

Nov. 10, 2011 (JP) ................. 2011-246808

(51) Int. Cl.
*H01M 10/0567* (2010.01)
*H01M 10/052* (2010.01)
*H01M 10/42* (2006.01)

(52) U.S. Cl.
CPC ........ *H01M 10/0567* (2013.01); *H01M 10/052* (2013.01); *H01M 10/4235* (2013.01); *H01M 2300/0025* (2013.01); *Y02E 60/122* (2013.01)

(58) Field of Classification Search
CPC .......... H01M 10/052; H01M 10/4235; H01M 2300/0025; H01M 10/0567; Y02E 60/122
See application file for complete search history.

(56) References Cited

U.S. PATENT DOCUMENTS

| 5,626,981 A | 5/1997 | Simon et al. |
| 2004/0007688 A1 | 1/2004 | Awano et al. |

(Continued)

FOREIGN PATENT DOCUMENTS

| CN | 101292389 | 10/2008 |
| CN | 102113164 | 6/2011 |

(Continued)

OTHER PUBLICATIONS

International Search Report, PCT/JP2012/078304, Dec. 18, 2012.

(Continued)

*Primary Examiner* — Basia Ridley
*Assistant Examiner* — Heng Chan
(74) *Attorney, Agent, or Firm* — Young & Thompson

(57) ABSTRACT

The invention provides a nonaqueous electrolyte for batteries and a nonaqueous secondary battery using the same which maintains small internal resistance and high electric capacity in high temperature storage. The nonaqueous electrolyte has an electrolyte salt, a compound of general formula (1), and a compound of general formula (2) dissolved in an organic solvent. The ratio of the compound of formula (2) to the sum of the compound of formula (1) and the compound of formula (2) is 0.1 to 8 mass %. In the formulae, $R^1$, $R^2$, $R^3$, and $R^4$ each independently represent C1-C8 alkyl.

4 Claims, 1 Drawing Sheet

(56) References Cited

U.S. PATENT DOCUMENTS

| | | |
|---|---|---|
| 2006/0269843 A1 | 11/2006 | Usami et al. |
| 2007/0243470 A1 | 10/2007 | Yamamoto et al. |
| 2009/0197167 A1 | 8/2009 | Olschimke |
| 2010/0015514 A1 | 1/2010 | Miyagi et al. |
| 2011/0136018 A1 | 6/2011 | Nogi et al. |
| 2013/0022861 A1 | 1/2013 | Miyagi et al. |
| 2015/0243936 A1 | 8/2015 | Miyagi et al. |

FOREIGN PATENT DOCUMENTS

| | | |
|---|---|---|
| JP | 63-102173 | 5/1988 |
| JP | 04-87156 | 3/1992 |
| JP | 05-74486 | 3/1993 |
| JP | 10-50342 | 2/1998 |
| JP | 2001-006729 | 1/2001 |
| JP | 2002-134169 | 5/2002 |
| JP | 2007-012595 | 1/2007 |
| JP | 2009-512148 | 3/2009 |
| WO | WO 2012/066878 | 5/2012 |
| WO | WO 2012/066879 | 5/2012 |

OTHER PUBLICATIONS

Sheng Shui Zhang—A review on electrolyte additives for lithium-ion batteries—Available online at www.sciencedirect.com , ScienceDirect—Journal of Power Sources 162 (2006) 1379-1394.

NONAQUEOUS ELECTROLYTE AND NONAQUEOUS SECONDARY BATTERY USING SAME

TECHNICAL FIELD

This invention relates to a nonaqueous electrolyte containing a dicarbonate compound having a specific structure and a nonaqueous secondary battery using the same.

BACKGROUND ART

With the recent spread of portable electronic equipment such as notebook computers, video camcorders, and personal digital assistances, nonaqueous electrolyte secondary batteries having high voltage and high energy density have come to be used widely as a power source. From the concern for the environmental protection, electric-powered vehicles and hybrid-powered vehicles utilizing electric powder as a part of motive power have already been put to practical use.

Various additives for electrolyte have been proposed to provide nonaqueous secondary batteries with improved stability or electrical characteristics. Examples of such additives include 1,3-propane sultone (see patent document 1 below), vinyl ethylene carbonate (see patent document 2 below), vinylene carbonate (see patent document 3 below), 1,3-propane sultone or butane sultone (see patent document 4 below), vinylene carbonate (see patent document 5 below), and vinyl ethylene carbonate (see patent document 6 below). These compounds are considered to form a stable film called a solid electrolyte interface covering the surface of a negative electrode, which film is expected to prevent reductive decomposition of an electrolyte. Other examples include disiloxane having an unsaturated group (e.g., vinyl) (see patent document 7 below), fluorosilane having an alkenyl group (see patent document 8 below), alkylenebisfluorosilane (see patent document 9 below), and fluorosilane having an ether group bonded (see patent document 10 below). These compounds are considered to be adsorbed onto the surface of a positive electrode to protect the positive electrode thereby to prevent oxidative decomposition of an electrolyte. However, the additives of this type repeat adsorption to and desorption from the electrolyte surface in high temperatures, so that their protective effect is not sufficient in high temperature storage.

Patent document 11 below describes that 1,2-bis(difluoromethylsilyl)ethane is usable as an additive for lithium batteries. The document, nevertheless, gives no disclosure about test results of batteries using the compound nor disclosure about a compound producing a synergistic effect with 1,2-bis(difluoromethylsilyl)ethane.

CITATION LIST

Patent document 1: JP 63-102173A
Patent document 2: JP 04-87156A
Patent document 3: JP 05-74486A
Patent document 4: JP 10-50342A
Patent document 5: US 5626981
Patent document 6: JP 2001-6729A
Patent document 7: JP 2002-134169A
Patent document 8: US 2004/0007688
Patent document 9: US 2006/0269843
Patent document 10: US 2007/0243470
Patent document 11: US 2009/0197167

SUMMARY OF THE INVENTION

Problem to be Solved by the Invention

An object of the invention is to provide a nonaqueous electrolyte for secondary batteries that is capable of maintaining a small internal resistance and a high electrical capacity and a nonaqueous secondary battery using the nonaqueous electrolyte.

Means for Solving the Problem

As a result of extensive investigations, the present inventors have found that the above object is accomplished by using a nonaqueous electrolyte containing fluorosilane compounds having a specific structure and completed the invention based on this finding.

The invention provides a nonaqueous electrolyte for secondary batteries comprising an electrolyte salt, a compound represented by general formula (1):

[Chemical Formula 1]

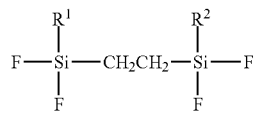

(1)

wherein $R^1$ and $R^2$ each independently represent an alkyl group having 1 to 8 carbon atoms,
and a compound represented by general formula (2):

[Chemical Formula 2]

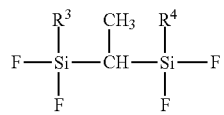

(2)

wherein $R^3$ and $R^4$ each independently represent an alkyl group having 1 to 8 carbon atoms,
dissolved in an organic solvent. The ratio of the compound represented by general formula (2) to the sum of the compound represented by general formula (1) and the compound represented by general formula (2) is 0.1 to 8% by mass.

Effect of the Invention

Using the nonaqueous electrolyte for secondary batteries provides a nonaqueous secondary battery that retains a high electrical capacity and a low internal resistance even after high temperature storage.

BEST MODE FOR CARRYING OUT THE INVENTION

Figure 1:
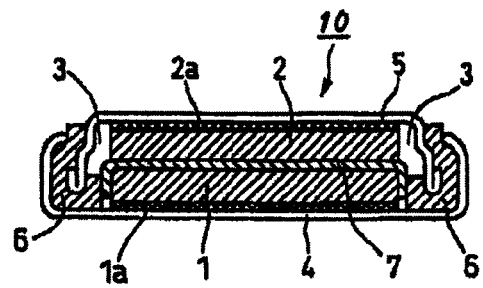
FIG. 1 is a schematic cross-sectional view of an exemplary coin-shaped nonaqueous secondary battery according to the present invention.

The nonaqueous electrolyte for secondary batteries and a nonaqueous secondary battery using the electrolyte will be illustrated in detail with reference to their preferred embodiments.

The nonaqueous electrolyte for secondary batteries of the invention comprises an electrolyte salt, the compound of general formula (1), and the compound of general formula (2) jointly dissolved in an organic solvent, being characterized in that the ratio of general formula (2) to the sum of the compound of general formula (1) and the compound of general formula (2) is 0.1 to 8 mass %.

The compound of general formula (1) will be described first. In general formula of general formula (1), $R^1$ and $R^2$ each independently represent an alkyl group having 1 to 8 carbon atoms. Examples of the C1-C8 alkyl group include methyl, ethyl, propyl, isopropyl, butyl, isobutyl, sec-butyl, tert-butyl, pentyl, isopentyl, sec-pentyl, tert-pentyl, hexyl, sec-hexyl, heptyl, sec-heptyl, octyl, sec-octyl, 2-methylpentyl, and 2-ethylhexyl. $R^1$ and $R^2$ each preferably represent methyl or ethyl, more preferably methyl, in terms of less adverse effect on lithium ion mobility and good charge characteristics. While $R^1$ and $R^2$ may be the same or different, it is preferred for at least one of them be methyl for the reason mentioned.

Preferred examples of the compound of general formula (1) are 1,2-bis(difluoromethylsilyl)ethane, 1,2-bis(difluoroethylsilyl)ethane, 1-difluoromethylsilyl-2-difluoroethylsilylethane, and 1-difluoromethylsilyl-2-difluoropropylsilylethane.

The compound of general formula (1) is obtained by displacing the chlorine atom or C1-C3 alkoxy group of a compound represented by general formula (1a) with a fluorine atom:

[Chemical Formula 3]

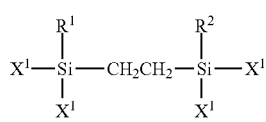

(1a)

wherein $R^1$ and $R^2$ have the same meaning as defined above; and $X^1$ represents a chlorine atom or an alkoxy group with 1 to 3 carbon atoms.

Displacement of $X^1$ of the compound of general formula (1a) with fluorine is accomplished by any known technique, for example, a method using antimony trifluoride (see *J. Amer. Chem. Soc.*, 68, 2655 (1946)), a method using calcium fluoride (see U.S. Pat. No. 3,646,092), or a method using a hydrofluoric acid aqueous solution (see *J. Amer. Chem. Soc.*, 73, 5127 (1951)).

The compound of general formula (2) will then be described. In general formula (2), $R^3$ and $R^4$ each independently represent an alkyl group having 1 to 8 carbon atoms. Examples of the C1-C8 alkyl group include those listed above for $R^1$ and $R^2$ of formula (1). $R^3$ and $R^4$ each preferably represent methyl or ethyl, more preferably methyl, in terms of less adverse effect on lithium ion mobility and good charge characteristics. While $R^3$ and $R^4$ may be the same or different, it is preferred for at least one of them be methyl for the reason mentioned.

Preferred examples of the compound of general formula (2) are 1,1-bis(difluoromethylsilyl)ethane, 1,1-bis(difluoroethylsilyl)ethane, 1-difluoromethylsilyl-1-difluoroethylsilylethane, and 1-difluoromethylsilyl-1-difluoropropylsilylethane.

In the nonaqueous electrolyte for secondary batteries of the invention, the ratio of the compound of general formula (2) to the sum of the compound of general formula (1) and the compound of general formula (2) is 0.1 to 8% by mass. The ratio is preferably 0.3 to 7 mass %, more preferably 0.5 to 6 mass %, to minimize reduction in battery performance in high temperature storage.

If the total content of the compound of general formula (1) and the compound of general formula (2) in the nonaqueous electrolyte for secondary batteries of the invention is too small, these compounds may fail to produce sufficient effects. If, to the contrary, the total content is too large, not only may effects reflecting the increased content not be obtained but the battery performance may be adversely affected. Accordingly, the total content of the compound of general formula (1) and the compound of general formula (2) is preferably 0.01 to 3 mass %, more preferably 0.02 to 2 mass %, even more preferably 0.03 to 1 mass %, relative to the nonaqueous electrolyte.

Similarly to the compound of general formula (1), the compound of general formula (2) is obtained by displacing the chlorine atom or the C1-C3 alkoxy group of a compound represented by general formula (2a) shown below with a fluorine atom.

[Chemical Formula 4]

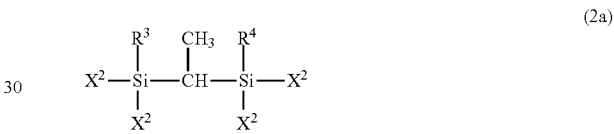

(2a)

wherein $R^3$ and $R^4$ have the same meaning as defined for general formula (2); and $X^2$ represents a chlorine atom or an alkoxy group having 1 to 3 carbon atoms.

The compound of general formula (2a) in which $X^2$ is methoxy, i.e., a compound represented by general formula (2d) shown below is obtained by, for example, hydrosilylation between a vinylsilane compound represented by general formula (2b) shown below and a hydrosilane compound represented by general formula (2c) shown below in the presence of a platinum catalyst. In this case, the desired compound is obtained as a mixture with a compound represented by general formula (2e) shown below. The production ratio of the compound of general formula (2d) depends on the platinum catalyst used. When in using a platinum-divinyltetramethyldisiloxane complex (so-called Karstedt's catalyst) or chloroplatinic acid, for example, the production ratio is 15% to 25% or 25% to 35%, respectively.

[Chemical Formula 5]

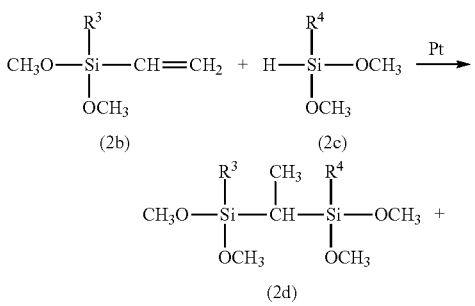

-continued

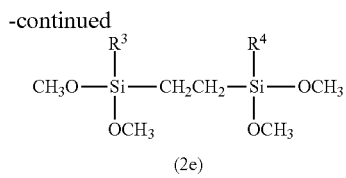

(2e)

wherein $R^3$ and $R^4$ have the same meaning as defined for general formula (2).

The mixture as obtained may be separated into the compound of formula (2d) and the compound of formula (2e), followed by displacing the methoxy group of the resulting compound of general formula (2d) with a fluorine atom. Otherwise, because the compound of general formula (2e) corresponds to the compound of general formula (1a), the mixture may be subjected as such to the displacement with fluorine.

The organic solvent that can be used in the nonaqueous electrolyte for secondary batteries according to the invention will then be described. One of or a combination of two or more of organic solvents commonly used in nonaqueous electrolytes may be used in the invention. Examples of useful organic solvents include saturated cyclic carbonate compounds, saturated cyclic ester compounds, sulfoxide compounds, sulfone compounds, amide compounds, saturated acyclic carbonate compounds, acyclic ether compounds, cyclic ether compounds, and saturated acyclic ester compounds.

Inter alia, saturated cyclic carbonate compounds, saturated cyclic ester compounds, sulfoxide compounds, sulfone compounds, and amide compounds have a high relative permittivity and therefore play a role to increase the dielectric constant of the nonaqueous electrolyte for secondary batteries. Saturated cyclic carbonate compounds are particularly preferred. Examples of the saturated cyclic carbonate compounds include ethylene carbonate, 1,2-propylene carbonate, 1,3-propylene carbonate, 1,2-butylene carbonate, 1,3-butylene carbonate, and 1,1-dimethylethylene carbonate. Examples of the saturated cyclic ester compounds include γ-butyrolactone, γ-valerolactone, γ-caprolactone, δ-hexanolacotne, and δ-octanolactone. Examples of the sulfoxide compounds include dimethyl sulfoxide, diethyl sulfoxide, dipropyl sulfoxide, diphenyl sulfoxide, and thiophene. Examples of the sulfone compounds include dimethyl sulfone, diethyl sulfone, dipropyl sulfone, diphenyl sulfone, sulfolane (also tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, with sulfolane and tetramethyl sulfolane being preferred. Examples of the amide compounds are N-methylpyrrolidone, dimethylformamide, and dimethylacetamide.

Of the above described organic solvents saturated acyclic carbonate compounds, acyclic ether compounds, cyclic ether compounds, and saturated acyclic ester compounds decrease the viscosity of the nonaqueous electrolyte for secondary batteries and increase mobility of electrolyte ions thereby to improve battery characteristics, such as power density. To have a low viscosity brings about improvement on the low temperature performance of the nonaqueous electrolyte for secondary batteries. Inter alia, saturated acyclic carbonate compounds are preferred. Examples of suitable saturated acyclic carbonate compounds include dimethyl carbonate, ethylmethyl carbonate, diethyl carbonate, ethylbutyl carbonate, methyl-t-butyl carbonate, diisopropyl carbonate, and t-butylpropyl carbonate. Examples of the acyclic or cyclic ether compounds include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, and diethylene glycol bis(trifluoroethyl)ether, with dioxolane being preferred.

The saturated acyclic ester compounds are preferably mono- or diester compounds having a total of 2 to 8 carbon atoms per molecule, such as methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Preferred of them are methyl formate, ethyl formate, methyl acetate, ethyl acetate, propyl acetate, isobutyl acetate, butyl acetate, methyl propionate, and ethyl propionate.

In addition to this, acetonitrile, propionitrile, nitromethane, and their derivatives are also usable as an organic solvent.

The electrolyte salt that can be used in the nonaqueous electrolyte for secondary batteries will be described. Conventionally known electrolyte salts can be used in the invention. Examples include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4LiCl$, $LiF$, $LiBr$, $LiI$, $LiAlF_4$, $LiAlCl_4$, $NaClO_4$, $NaBF_4$, and $NaI$, and their derivatives. It is preferred to use at least one of $LiPF_6$, $LiBF_4$, $LiClO_4$, $LiAsF_6$, $LiCF_3SO_3$, $LiC(CF_3SO_2)_3$, $LiCF_3SO_3$ derivatives, and $LiC(CF_3SO_2)_3$ derivatives in terms of good electrical characteristics.

The electrolyte salt is preferably dissolved in the organic solvent in a concentration of 0.1 to 3.0 mol/l, still preferably 0.5 to 2.0 mol/l. At electrolyte salt concentrations lower than 0.1 mol/l, the resulting battery may fail to provide a sufficient current density. Salt concentrations higher than 3.0 mol/l can impair the stability of the nonaqueous electrolyte.

It is preferred that the nonaqueous electrolyte for secondary batteries of the invention further contain a compound represented by general formula (3) shown below so as to produce higher synergistic effect of the compound of general formula (1) and the compound of general formula (2).

[Chemical Formula 6]

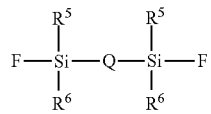

(3)

wherein $R^5$ and $R^6$ each independently represent an alkyl group having 1 to 8 carbon atoms, a haloalkyl group having 1 to 8 carbon atoms, an alkenyl group having 2 to 8 carbon atoms, an alkynyl group having 2 to 8 carbon atoms, or an aryl group having 6 to 8 carbon atoms; and Q represents an oxygen atom or a divalent hydrocarbon group having 1 to 6 carbon atoms.

In general formula (3), $R^5$ and $R^6$ each independently represent an alkyl group having 1 to 8 carbon atoms, a haloalkyl group having 1 to 8 carbon atoms, an alkenyl group having 2 to 8 carbon atoms, an alkynyl group having 2 to 8 carbon atoms, or an aryl group having 6 to 8 carbon atoms. Examples of the C1-C8 alkyl group include those described supra for $R^1$ and $R^2$ of general formula (1). Examples of the C1-C8 haloalkyl group include trifluoromethyl, 2-fluoroethyl, 2,2,2-trifluoroethyl, 1,1,2,2-tetrafluoroethyl, pentafluoroethyl, 3-fluoropropyl, 3,3,3-trifluoropropyl, 2,2,3,3-tetrafluoropropyl, heptafluoropropyl, chloromethyl, 1-chloroethyl, 2-chloroethyl, 3-chloropropyl, 4-chlorobutyl, 5-chloropentyl, 6-chlorohexyl, and 8-chlorooctyl. Examples of the C2-C8 alkenyl group include vinyl, allyl, 3-butenyl, 4-propenyl, 5-hexenyl, and 7-octenyl. Examples of the C2-C8 alkynyl group include ethynyl, 2-propynyl, 3-butynyl, 4-pentynyl, 5-hexynyl, and 7-octynyl. Examples of the C6-C8 aryl group include phenyl, toluoyl, xylyl, ethylphenyl, fluorophenyl, difluorophenyl, chlorophenyl, and dichlorophenyl. $R^5$ and $R^6$ each preferably represent methyl, ethyl, propyl, isopropyl, butyl, pentyl, 3-chloropropyl, or 4-chlorobutyl, more preferably methyl, ethyl, or propyl, even more preferably methyl or ethyl, in terms of less adverse effect on lithium ion mobility and good charge characteristics.

In general formula (3), Q represents an oxygen atom or a divalent C1-C6 hydrocarbon group. Examples of the divalent C1-C6 hydrocarbon group include methylene, ethylene, trimethylene, tetramethylene, pentamethylene, hexamethylene, 2-methylbutan-1,4-diyl, 1,2-ethynyl, 2-buten-1,4-diyl, 2-buten-2,3-diyl, vinylene, ethynylene, and phenylene. Q is preferably oxygen, ethylene, or trimethylene, more preferably oxygen or ethylene, in terms of high battery performance.

Examples of preferred compounds of general formula (3) include 1,3-difluoro-1,1,3,3-tetramethyldisiloxane, 1,3-difluoro-1,1,3,3-tetraethyldisiloxane, 1,3-difluoro-1,1,3,3-tetrapropyldisiloxane, 1,3-difluoro-1,1,3,3-tetrabutyldisiloxane, 1,3-difluoro-1,1,3,3-tetrapentyldisiloxane, 1,3-difluoro-1,1,3,3-tetrahexyldisiloxane, 1,2-bis(fluorodimethylsilyl)ethane, 1,2-bis(fluorodiethylsilyl)ethane, 1,2-bis(fluorodipropylsilyl)ethane, 1,2-bis(fluorodibutylsilyl)ethane, 1-fluorodimethylsilyl-2-fluoroethylsilylethane, 1,3-bis(fluorodimethylsilyl)propane, 1,3-bis(fluorodiethylsilyl)propane, 1,3-bis(fluorodipropylsilyl)propane, and 1,3-bis(fluorodibutylsilyl)propane.

If the content of the compound of general formula (3) in the nonaqueous electrolyte of the invention is too small, the compound may fail to produce sufficient effects. If, to the contrary, the content is too large, not only may effects reflecting the increased content not be obtained but the battery performance may be adversely affected. Accordingly, the content of the compound of general formula (3) is preferably 0.01 to 5 mass %, more preferably 0.03 to 4 mass %, even more preferably 0.05 to 3 mass %, relative to the nonaqueous electrolyte. The compounds of general formula (3) may be used either individually or in combination of two or more thereof.

It is preferred that the nonaqueous electrolyte for secondary batteries of the invention further contain one or more compounds selected from the group consisting of a cyclic carbonate compound having an unsaturated group, an acyclic carbonate compound having an unsaturated group, an unsaturated diester compound, a halogenated cyclic carbonate compound, a cyclic sulfurous acid ester, and a cyclic sulfuric acid ester.

Examples of the cyclic carbonate compound having an unsaturated group include vinylene carbonate, vinyl ethylene carbonate, propylidene carbonate, ethylene ethylidene carbonate, and ethylene isopropylidene carbonate. Examples of the acyclic carbonate compound having an unsaturated group include dipropargyl carbonate, propargyl methyl carbonate, ethyl propargyl carbonate, bis(1-methylpropargyl)carbonate, and bis(1-dimethylpropargyl)carbonate. Examples of the unsaturated diester compound include dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, dimethyl acetylenedicarbonate, diethyl acetylenedicarbonate, dipropyl acetylenedicarbonate, dibutyl acetylenedicarbonate, dipentyl acetylenedicarbonate, dihexyl acetylenedicarbonate, diheptyl acetylenedicarbonate, and dioctyl acetylenedicarbonate. Examples of the halogenated cyclic carbonate compound include chloroethylene carbonate, dichloroethylene carbonate, fluoroethylenecarbonate, and difluoroethylene carbonate. Examples of the cyclic sulfurous acid ester include ethylene sulfite. Examples of the cyclic sulfuric acid ester include propane sultone and butane sultone. Preferred of these compounds are vinylene carbonate, vinyl ethylene carbonate, dipropargyl carbonate, dimethyl acetylenedicarboxylate, diethyl acetylenedicarboxylate, chloroethylene carbonate, dichloroethylene carbonate, fluoroethylene carbonate, ethylene sulfite, propane sultone, and butane sultone. More preferred are vinylene carbonate, dipropargyl carbonate, dimethyl acetylenedicarboxylate, chloroethylene carbonate, fluoroethylene carbonate, ethylene sulfite, and propane sultone. Even more preferred are vinylene carbonate, dipropargyl carbonate, chloroethylene carbonate, fluoroethylene carbonate, ethylene sulfite, and propane sultone.

These compounds may be used either individually or in combination. If the content of the compound described in the nonaqueous electrolyte of the invention is too small, the compound may fail to produce sufficient effects. If, to the contrary, the content is too large, not only may effects reflecting the increased content not be obtained but the battery performance may be adversely affected. Accordingly, the total content of these compounds is preferably 0.005 to 10 mass %, more preferably 0.02 to 5 mass %, even more preferably 0.05 to 3 mass %, relative to the nonaqueous electrolyte.

The above mentioned nonaqueous electrolyte for secondary batteries of the invention is particularly suited for use as a nonaqueous electrolyte composing lithium ion secondary batteries.

The nonaqueous secondary battery of the invention will then be described.

The nonaqueous secondary battery of the invention includes a negative electrode containing a negative electrode active material, a positive electrode containing a positive electrode active material, and a nonaqueous electrolyte, being characterized in that the nonaqueous electrolyte is the nonaqueous electrolyte for secondary batteries of the invention. The nonaqueous secondary battery of the invention may have a separator between the negative and the positive electrode.

The positive electrode of the nonaqueous secondary battery of the invention is prepared by dispersing a positive electrode active material, a binder, an electroconductive material, and other positive electrode materials in an organic solvent or water, applying the resulting slurry to a current collector, drying the slurry, followed by, if needed, rolling into a sheet.

Examples of the positive electrode active material include $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $LiV_2O_3$, and $V_2O_5$ (wherein x is a number of 0 to 1). The positive electrode active material may contain or be substituted with Li, Mg, Al, or a transition metal (e.g., Co, Ti, Nb, or Cr). The lithium-metal complex oxides may be used either individually or in combination thereof. The lithium-metal complex oxide is preferably one or more of a lithium/manganese-containing complex oxide, a lithium/nickel-containing complex oxide, and lithium/cobalt-containing complex oxide each having a layer structure or a spinel structure.

Examples of the binder for the positive electrode active material include, but are not limited to, polyvinylidene fluoride, polytetrafluoroethylene, EPDM, SBR, NBR, fluororubber, and polyacrylic acid.

The binder is preferably used in an amount of 0.1 to 20 parts by mass, more preferably 0.5 to 10 parts by mass, per 100 parts by mass of the positive electrode active material.

Examples of the electroconductive material used to make the positive electrode includes, but are not limited to, fine particles of graphite, fine particles of amorphous carbon such as carbon blacks (e.g., acetylene black or ketjen black) and needle coke, and carbon nanofibers.

The electroconductive material is preferably used in an amount of 0.01 to 20 parts by mass, more preferably 0.1 to 10 parts by mass, per 100 parts by mass of the positive electrode active material.

The solvent for preparing the slurry is an organic solvent or water capable of dissolving the binder. Examples of such an organic solvent include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran.

The solvent is used in an amount of 30 to 300 parts by mass, more preferably 50 to 200 parts by mass, per 100 parts by mass of the positive electrode active material.

The current collector of the positive electrode is usually made of aluminum, stainless steel, or nickel-plated steel.

The negative electrode of the nonaqueous secondary battery of the invention is prepared by dispersing a negative electrode active material, a binder, an electroconductive material, etc. in an organic solvent or water, applying the resulting slurry to a current collector, drying the slurry, followed by, where needed, rolling into a sheet.

Examples of the negative electrode active material include crystalline carbon materials such as synthetic graphite and natural graphite, a single metal such as lithium, tin, zinc, or aluminum, or an alloy thereof. Particularly preferred is a crystalline carbon material.

Examples of the binder for the negative electrode active material include, but are not limited to, polyvinylidene fluoride, polytetrafluoroethylene, EPDM, SBR, NBR, fluororubber, and polyacrylic acid.

The binder is preferably used in an amount of 0.001 to 5 parts by mass, more preferably 0.05 to 3 parts by mass, even more preferably 0.01 to 2 parts by mass, per 100 parts by mass of the negative electrode active material.

Examples of the electroconductive material used to make the negative electrode includes, but are not limited to, fine particles of graphite, fine particles of amorphous carbon such as carbon blacks (e.g., acetylene black or ketjen black) and needle coke, and carbon nanofibers.

The electroconductive material is preferably used in an amount of 0.01 to 20 parts by mass, more preferably 0.05 to 15 parts by mass, per 100 parts by mass of the positive electrode active material.

The solvent for preparing the slurry is an organic solvent or water capable of dissolving the binder. Examples of such an organic solvent include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran.

The solvent is used in an amount of 30 to 300 parts by mass, more preferably 50 to 200 parts by mass, per 100 parts by mass of the negative electrode active material.

The negative electrode contains an electroconductive material, such as furnace black, acetylene black, ketjen black, vapor grown carbon fiber, or carbon nanofiber, for the purpose of improving electroconductivity of the electrode.

The current collector of the negative electrode is usually made of copper, nickel, stainless steel, or nickel-plated copper.

It is preferable to interpose a separator between the positive and the negative electrode in the nonaqueous electrolyte secondary battery according to the invention. A commonly employed microporous polymer film can be used as a separator with no particular restriction. Polymer materials providing a microporous film separator include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers such as polyethylene oxide and polypropylene oxide, celluloses such as carboxymethyl cellulose and hydroxypropyl cellulose, poly(meth)acrylic acid and esters thereof; derivatives of these polymers; copolymers of monomers of the recited polymers; and polyblends of these polymer materials. The separator may be a single film or a composite film composed of two or more films. Various additives may be added to the separator film with no particular limitation on the kind and amount. A film made of polyethylene, polypropylene, polyvinylidene fluoride, or polysulfone is particularly preferred for use in the nonaqueous secondary battery of the invention.

The separator film is microporous for allowing the electrolyte ions to penetrate therethrough. Such a microporous film is prepared by (1) a phase separation method comprising inducing microphase separation in a solution of a polymer in a solvent in film form and removing the solvent by extraction and (2) a stretching method comprising extruding a molten polymer at a high draft ratio, heat treating the extruded film to unidirectionally align the crystals, and stretching the film to form voids between crystals. The method of microporous film formation is chosen according to the film material.

In order to ensure safety of the nonaqueous secondary battery of the invention, a phenol antioxidant, a phosphorus antioxidant, a thioether antioxidant, a hindered amine compound, or a like stabilizer may be added to the electrode materials, the nonaqueous electrolyte, or the separator.

The nonaqueous secondary battery of the invention is not particularly limited in shape and may be coin-shaped, cylindrical, or rectangular. FIG. 1 illustrates an example of a coin-shaped nonaqueous secondary battery of the invention, and FIGS. 2 and 3 each illustrate an example of a cylindrical nonaqueous secondary battery of the invention.

The coin battery 10 illustrated in FIG. 1 has a positive electrode 1 capable of deintercalating lithium ions, a positive electrode current collector 1*a*, a negative electrode 2 made of a carbonaceous material capable of intercalating/deintercalating lithium ions released from the positive electrode, a negative electrode current collector 2*a*, a nonaqueous electrolyte 3 according to the invention, a positive electrode case 4 made of stainless steel, a negative electrode case 5 made of stainless steel, a polypropylene gasket 6, and a polyethylene separator 7.

Figure 2:
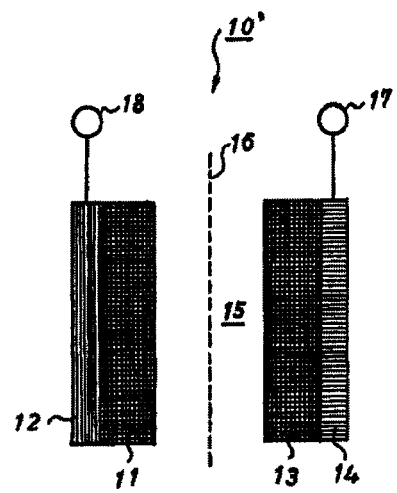
FIG. 2 schematically illustrates the basic structure of a cylindrical nonaqueous secondary battery according to the invention.
Figure 3:
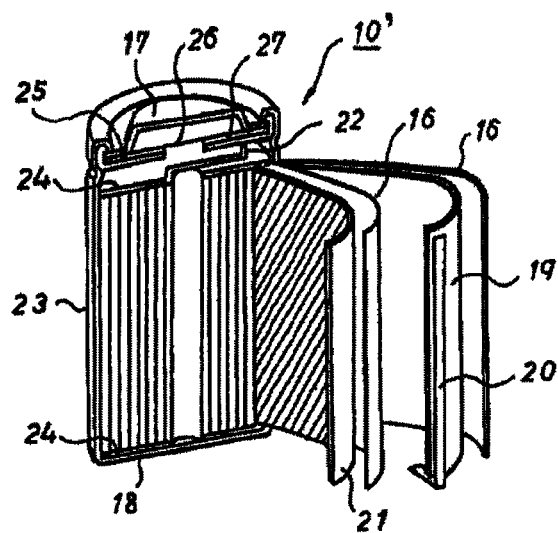
FIG. 3 is a perspective view, with parts exploded and parts in cross-section, illustrating a cylindrical nonaqueous secondary battery of the invention.

As illustrated in FIGS. 2 and 3, the cylindrical battery 10' includes a negative electrode 11, a negative electrode current collector 12, a positive electrode 13, a positive electrode current collector 14, a nonaqueous electrolyte 15 of the present invention, a separator 16, a positive electrode terminal 17, a negative electrode terminal 18, a negative electrode plate 19, a negative electrode lead 20, a positive electrode plate 21, a positive electrode lead 22, a case 23, an insulating plate 24, a gasket 25, a safety valve 26, and a PTC element 27.

EXAMPLE

The invention will now be illustrated in greater detail with reference to Examples, but it should be understood that the invention is not construed as being limited thereto. Unless otherwise noted, all the parts and percents are by mass.

Preparation Example 1 shows synthesis of a compound of general formula (1).

Preparation Example 2 demonstrates preparation of a mixture of a compound of general formula (1) and a compound of general formula (2). Examples 1 through 9 and Comparative Examples 1 through 8 show nonaqueous electrolytes of the invention and nonaqueous secondary batteries using the same and their comparative examples.

Preparation Example 1

Synthesis of 1,2-Bis(difluoromethylsilyl)ethane

A glass reactor equipped with a thermometer, a stirrer, and a condenser was charged with 76.8 g (0.43 mol) of antimony trifluoride, and, while cooling with water to 0° to 10° C., 76.8 g (0.3 mol) of 2-bis(dichloromethylsilyl)ethane was added thereto dropwise. The 2-bis(dichloromethylsilyl)ethane used here had a purity of 99.5% and contained 0.1% of 1,1-bis(difluoromethylfluorosilyl)ethane. After the dropwise addition, the mixture was stirred at 30° C. for 2 hours to complete the reaction. The reaction solution was distilled twice to yield 40.2 g of 1,2-bis(difluoromethylsilyl)ethane (designated compound A1) free from 1,1-bis(difluoromethylsilyl)ethane. The 1,2-bis(difluoromethylsilyl)ethane thus obtained is a compound of general formula (1) in which $R^1$ and $R^2$ are both methyl.

Preparation Example 2

Synthesis of 1,2-Bis(difluoromethylsilyl)ethane/1,1-bis(difluoromethylsilyl)ethane Mixture A stainless steel pressure vessel equipped with a thermometer, a stirrer, and a condenser was charged with 53.6 g (0.4 mol) of dimethoxymethylsilane, 67.2 g (0.42 mol) of dimethoxymethylvinylsilane, and 0.5 ml of a 0.1 mol/l solution of chloroplatinic acid in isopropyl alcohol. The vessel was closed, and the contents were heated while stirring at 80° C. for 30 minutes. After completion of the reaction, the reaction mixture was distilled to give 88.4 g of a mixture of 1,2-bis(dimethoxymethylsilyl)ethane and 1,1-bis(dimethoxymethylsilyl)ethane. To a PFA reactor equipped with a thermometer, a stirrer, and a condenser were put 76.8 g (a total of 0.3 mol) of the mixture as obtained above and 50 g of cyclopentane. While cooling the reactor with water to 0° to 10° C., 58.7 g (1.35 mol) of 46% aqueous hydrofluoric acid was added thereto dropwise. After the dropwise addition, the stirring was continued for 2 hours at 30° C. to complete the reaction. The reaction solution was allowed to stand, and the separated aqueous layer was removed. The organic layer was washed with a saturated sodium chloride aqueous solution and evaporated to give 44.7 g of a mixture containing 70% 1,2-bis(difluoromethylsilyl)ethane and 30% 1,1-bis(difluoromethylsilyl)ethane (designated mixture A2). The 1,2-bis(difluoromethylsilyl)ethane is a compound of general formula (1) in which $R^1$ and $R^2$ are both methyl, and the 1,1-bis(difluoromethylsilyl)ethane is a compound of general formula (2) in which $R^3$ and $R^4$ are both methyl.

Examples 1 to 9 and Comparative Examples 1 to 9

Preparation of Nonaqueous Electrolytes and Making of Nonaqueous Secondary Batteries using Same (a) Preparation of Nonaqueous Electrolyte Additive(s) selected from compound A1, mixture A2, compound B1, compound B2, compound C1, and compound C2 described below was/were dissolved in electrolyte solution A described below in ratios shown in Table 1 below to prepare nonaqueous electrolytes of the invention and comparative nonaqueous electrolytes. In Table 1 the figures in the parentheses represent the concentrations (mass %) in the nonaqueous electrolyte.

Compound A1: 1,2-bis(difluoromethylsilyl)ethane
Mixture A2: 1,2-bis(difluoromethylsilyl)ethane (70%)/1,1-bis(difluoromethylsilyl)ethane (30%)
Compound B1: 1,2-bis(fluorodimethylsilyl)ethane
Compound B2: 1,3-difluoro-1,1,3,3-tetramethyldisiloxane
Compound C1: vinylene carbonate
Compound C2: Propane sultone
Electrolyte solution A: 1 mol/l solution of $LiPF_6$ in a mixed solvent comprising 30 vol % ethylene carbonate, 40 vol % ethyl methyl carbonate, 25 vol % dimethyl carbonate, and 5 vol % propyl acetate.

TABLE 1

| | Additive to Electrolyte | | Electrolyte Solution | 1,1-Compound Content* (%) |
|---|---|---|---|---|
| Example 1 | A1 (0.497) A2 (0.003) | — | A | 0.18 |
| Example 2 | A1 (0.494) A2 (0.006) | — | A | 0.36 |
| Example 3 | A1 (0.44) A2 (0.06) | — | A | 3.6 |
| Example 4 | A1 (0.41) A2 (0.09) | — | A | 5.4 |
| Example 5 | A1 (0.38) A2 (0.12) | — | A | 7.2 |
| Example 6 | A1 (0.44) A2 (0.06) | B1 (0.5) | A | 3.6 |
| Example 7 | A1 (0.41) A2 (0.09) | B2 (0.5) | A | 5.4 |
| Example 8 | A1 (0.44) A2 (0.06) | C1 (0.1) | A | 3.6 |
| Example 9 | A1 (0.41) A2 (0.09) | C2 (0.5) | A | 5.4 |
| Compara. Example 1 | A1 (0.5) | — | A | 0.0 |
| Compara. Example 2 | A1 (0.499) A2 (0.001) | — | A | 0.06 |
| Compara. Example 3 | A1 (0.25) A2 (0.25) | — | A | 15.0 |
| Compara. Example 4 | A2 (0.5) | — | A | 30.0 |
| Compara. Example 5 | A1 (0.499) A2 (0.001) | B1 (0.5) | A | 0.06 |
| Compara. Example 6 | A1 (0.25) A2 (0.25) | B2 (0.5) | A | 15.0 |
| Compara. Example 7 | A1 (0.499) A2 (0.001) | C1 (0.1) | A | 0.06 |
| Compara. Example 8 | A1 (0.25) A2 (0.25) | C2 (0.5) | A | 15.0 |

*1,1-Compound content = 100 × (1,1-compound)/[(1,2-compound) + (1,1-compound)]; wherein (1,2-compound) = 1,2-bis(difluoromethylsilyl)ethane content in electrolyte; (1,1-compound) = 1,1-bis(difluoromethylsilyl)ethane content in electrolyte (b) Making of Positive Electrode A positive electrode active material mixture was prepared by mixing 90 parts of $LiCoO_2$ as an active material, 5 parts of acetylene black as an electroconductive material, and 5 parts of polyvinylidene fluoride as a binder. The active material mixture was dispersed in 140 parts of N-methyl-2-pyrrolidone, and the resulting slurry was applied to an aluminum current collector, dried, and pressed to make a positive electrode plate, which was cut to size to provide a disk-shaped positive electrode.

(c) Making of Negative Electrode

A negative electrode active material mixture was prepared by mixing 97.5 parts of synthetic graphite as an active material, 1.5 parts of styrene-butadiene rubber as a binder, and 1.0 part of carboxymethyl cellulose as a thickener. The active material mixture was dispersed in 120 parts of water, and the resulting slurry was applied to a copper current collector, dried, and pressed to make a negative electrode plate, which was cut to size to provide a disk-shaped negative electrode.

(d) Assembly of Battery

The disk-shaped positive and negative electrodes were put into a case with a 25 μm thick polyethylene microporous film interposed therebetween. The nonaqueous electrolyte or the comparative nonaqueous electrolyte shown in Table 1 was poured into the case, and the case was closed and sealed to make 20 mm diameter, 3.2 mm thick coin-shaped lithium secondary batteries of Examples 1 to 9 and Comparative Examples 1 to 8.

The lithium secondary batteries of Examples 1 to 9 and Comparative Examples 1 to 8 were tested for initial characteristics and cycle characteristics by the test methods described below. A discharge capacity ratio and an internal resistance ratio were obtained by the initial characteristics testing. A discharge capacity retention and an internal resistance increase ratio were obtained by the cycle characteristics testing. The test results obtained are shown in Table 2. A higher discharge capacity ratio and a lower internal resistance ratio indicate higher initial performance of the nonaqueous secondary battery. A higher discharge capacity retention and a lower internal resistance increase ratio indicate higher cycle characteristics of the nonaqueous secondary battery.

(1) Test Method for Initial Characteristics (1-1) Determination of Discharge Capacity Ratio The lithium secondary battery was placed in a thermostat at 20° C. and charged by the CC/CV method at a constant current of 0.3 mA/cm$^2$, which corresponds to a rate of 0.2C, to 4.3 V and then discharged at a constant current of 0.3 mA/cm$^2$, which corresponds to a rate of 0.2C, to 3.0 V for 5 cycles. Thereafter, the battery was charged by the CC/CV method at 0.3 mA/cm$^2$ to 4.3 V and discharged at a constant current of 0.3 mA/cm$^2$ to 3.0 V. The discharge capacity in this 6th discharge was taken as the initial discharge capacity of the battery. A ratio of the initial discharge capacity as measured to that of Example 1, being taken as 100, was calculated as follows to give a discharge capacity ratio (%).

Discharge capacity ratio (%)=[(initial discharge capacity)/(initial discharge capacity of Example 1)]×100

(1-2) Determination of Internal Resistance Ratio

The lithium secondary battery after the measurement of the discharge capacity in the sixth cycle was charged at a constant current of 1.5 mA/cm$^2$ (corresponding to a rate of 1C) to an SoC of 60%. The impedance was measured over a frequency range of from 100 kHz to 0.02 Hz using an alternating current impedance measurement system (a mobile potentiostat CompactStat from Ivium Technologies) to prepare a Cole-Cole plot with the imaginary part as ordinate and the real part as abscissa. The arc of the Cole-Cole plot was fitted with a circle. The greater value of the two intersections between the fitting circle and the real part is taken as the initial internal resistance of the battery. A ratio of the initial internal resistance thus determined to the initial internal resistance of Example 1 (being taken as 100) was calculated as follows to give an initial internal resistance ratio.

Internal resistance ratio (%)=[(initial internal resistance)/(initial internal resistance of Example 1)]×100

(2) Test Method for Cycle Characteristics (2-1) Determination of Discharge Capacity Retention The lithium secondary battery after the initial characteristics test was placed in a thermostat at 60° C. and charged at a constant current of 1.5 mA/cm$^2$, which corresponds to a rate of 1C (a rate of 1C means that an entire battery capacity will be discharged in one hour) to 4.3 V and then discharged at a constant current of 1.5 mA/cm$^2$ to 3.0 V for a total of 250 cycles. The discharge capacity in the 250th cycle was taken as a discharge capacity after cycles. A ratio of the discharge capacity after cycles to the initial discharge capacity (being taken as 100) was calculated as follows to give a discharge capacity retention (%).

Discharge capacity retention (%)=[(discharge capacity after cycles)/(initial discharge capacity)]×100

(2-2) Determination of Internal Resistance Increase Ratio

The battery after the cycle test was returned to an environment of 20° C. to determine the internal resistance at 20° C. in the same manner as described above, which was taken as an internal resistance after cycles. A ratio of the increase in internal resistance after the cycle test to the initial internal resistance (being taken as 100) was calculated as follows to give an internal resistance increase ratio (%).

Internal resistance increase ratio (%)=[(internal resistance after cycles−initial internal resistance)/(initial internal resistance)]×100

TABLE 2

| | Initial Characteristics | | Cycle Characteristics | |
| --- | --- | --- | --- | --- |
| | Discharge Capacity Ratio | Internal Resistance Ratio | Discharge Capacity Retention | Internal Resistance Increase Ratio |
| Example 1 | 100 | 100 | 84 | 26 |
| Example 2 | 100 | 102 | 87 | 24 |
| Example 3 | 99 | 102 | 88 | 18 |
| Example 4 | 99 | 104 | 87 | 17 |
| Example 5 | 100 | 105 | 86 | 26 |
| Example 6 | 101 | 105 | 88 | 16 |
| Example 7 | 99 | 97 | 90 | 15 |
| Example 8 | 100 | 93 | 91 | 18 |
| Example 9 | 100 | 101 | 89 | 20 |
| Compara. Example 1 | 100 | 105 | 78 | 32 |
| Compara. Example 2 | 100 | 103 | 79 | 31 |
| Compara. Example 3 | 99 | 142 | 74 | 59 |
| Compara. Example 4 | 98 | 172 | 68 | 74 |
| Compara. Example 5 | 100 | 103 | 77 | 31 |
| Compara. Example 6 | 99 | 138 | 77 | 51 |
| Compara. Example 7 | 100 | 104 | 76 | 32 |
| Compara. Example 8 | 99 | 146 | 75 | 67 |

As is apparent from the results in Table 2, it was confirmed that, when the compound of general formula (1) (1,2-bis (difluoromethylsilyl)ethane) and the compound of general formula (2) (1,1-bis(difluoromethylsilyl)ethane) are used in a specific ratio as in the nonaqueous electrolytes of the invention, reduction in discharge capacity and increase in internal resistance are prevented in the cycle test at 60° C., whereby excellent battery characteristics are maintained.

DESCRIPTION OF REFERENCE NUMERALS

1: positive electrode
1a: positive electrode current collector
2: negative electrode
2a: negative electrode current collector
3: nonaqueous electrolyte
4: positive electrode case
5: negative electrode case
6: gasket
7: separator
10: coin-shaped nonaqueous secondary battery
10': cylindrical nonaqueous secondary battery
11: negative electrode
12: negative electrode current collector
13: positive electrode
14: positive electrode current collector
15: nonaqueous electrolyte
16: separator
17: positive electrode terminal
18: negative electrode terminal
19: negative electrode plate
20: negative electrode lead
21: positive electrode
22: positive electrode lead
23: case
24: insulating plate
25: gasket
26: safety valve
27: PTC element

INDUSTRIAL APPLICABILITY

The nonaqueous electrolyte for secondary batteries according to the invention provides a nonaqueous secondary battery that maintains a small internal resistance and a high discharge capacity even in use for a long time and in an environment with widely varying temperatures. The nonaqueous secondary battery of the invention is suited to a variety of uses, including video camcorders, digital cameras, portable music players, sound recorders, portable DVD players, portable game devices, notebook computers, electronic dictionaries, electronic notebooks, electronic books, cellular phones, power-assisted bicycles, electric-powered vehicles, and hybrid-powered vehicles. It is especially suited for application to electric-powered and hybrid-powered vehicles, where nonaqueous secondary batteries are often exposed to high temperatures.

The invention claimed is:

1. A nonaqueous electrolyte for secondary batteries comprising an electrolyte salt, a compound represented by general formula (1):

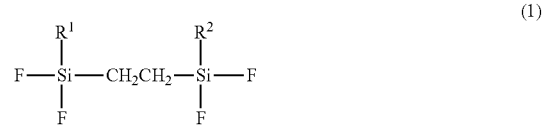

wherein $R^1$ and $R^2$ each independently represent an alkyl group having 1 to 8 carbon atoms, and a compound represented by general formula (2):

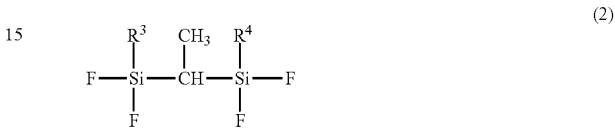

wherein $R^3$ and $R^4$ each independently represent an alkyl group having 1 to 8 carbon atoms, dissolved in an organic solvent, the ratio of the compound represented by general formula (2) to the sum of the compound represented by general formula (1) and the compound represented by general formula (2) being 0.1 to 8% by mass.

2. The nonaqueous electrolyte for secondary batteries according to claim 1, further comprising a compound represented by general formula (3):

wherein $R^5$ and $R^6$ each independently represent an alkyl group having 1 to 8 carbon atoms, a haloalkyl group having 1 to 8 carbon atoms, an alkenyl group having 2 to 8 carbon atoms, an alkynyl group having 2 to 8 carbon atoms, or an aryl group having 6 to 8 carbon atoms; and Q represents an oxygen atom or a divalent hydrocarbon group having 1 to 6 carbon atoms.

3. A nonaqueous secondary battery comprising a negative electrode containing a negative electrode active material, a positive electrode containing a positive electrode active material, and the nonaqueous electrolyte for secondary batteries according to claim 1.

4. A nonaqueous secondary battery comprising a negative electrode containing a negative electrode active material, a positive electrode containing a positive electrode active material, and the nonaqueous electrolyte for secondary batteries according to claim 2.

* * * * *